May 20, 1952 C. B. GALLAGHER 2,597,145
TRANSFER STAMPING MACHINE
Filed Dec. 29, 1947 6 Sheets-Sheet 4

May 20, 1952 — C. B. GALLAGHER — 2,597,145

TRANSFER STAMPING MACHINE

Filed Dec. 29, 1947 — 6 Sheets-Sheet 5

Inventor
Charles B. Gallagher
By
Agent

May 20, 1952     C. B. GALLAGHER     2,597,145
TRANSFER STAMPING MACHINE
Filed Dec. 29, 1947     6 Sheets-Sheet 6
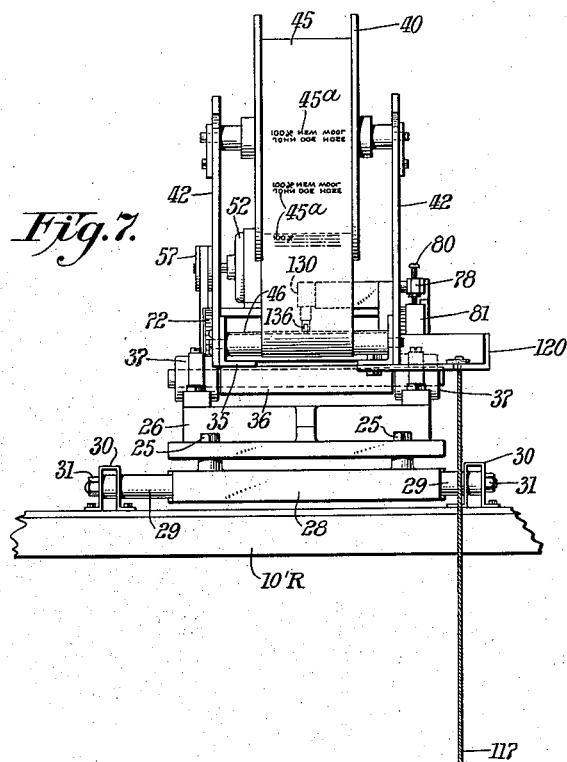
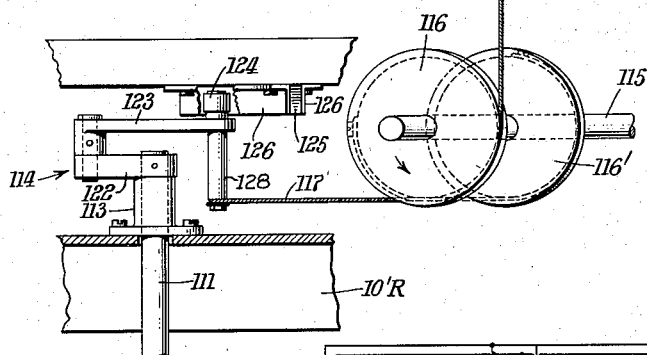
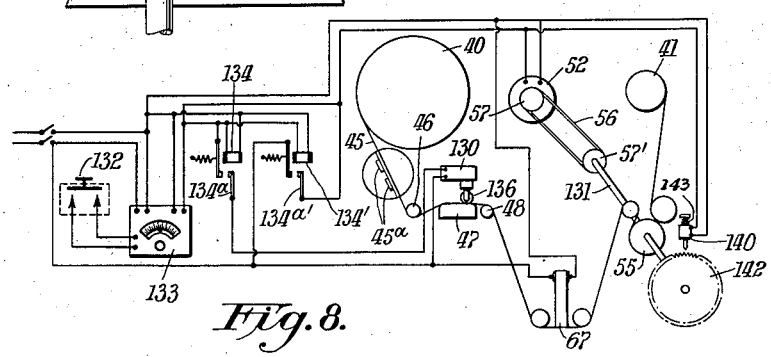
Inventor
Charles B. Gallagher
By
Agent Patented May 20, 1952

2,597,145

UNITED STATES PATENT OFFICE 2,597,145

TRANSFER STAMPING MACHINE

Charles B. Gallagher, Red Bank, N. J.

Application December 29, 1947, Serial No. 794,228

3 Claims. (Cl. 41—1)

This invention relates to improvements in equipment for stamping upon articles of manufacture, and in particular to a machine for stamping printed impressions on special articles such as textile hosiery. In the preferred physical embodiment of the invention described herein, hot press stamping devices are incorporated in a machine in a manner whereby the equipment may be used in a hosiery mill in conjunction with the final operation of identifying the sizes of hosiery or the quality of the material or for marking, as in the case of trade-marks or trade style, on the finished product.

Production stamping equipment presently used in hosiery mills is limited in efficiency and in the accuracy with which stamping is performed. Hand stamping with the use of a hot iron applied over a transfer sheet is used in many instances, but is a slow, inaccurate, and tedious endeavor. Semi-automatic stamping machines have been developed and are used to some extent in more progressive establishments as an improvement over hand stamping equipment. However, these machines have limitations in their facilities for effecting high quality production, particularly as regards accurate registration of the stamped impression.

With the foregoing explanation in mind, the principal objects of my invention are to provide a hosiery stamping press more adaptable to the scheme of production in modern hosiery mills than those which are in present use and to provide such a machine which will produce a high quality of work at an efficient operating rate. I accomplish these objects, in part, by employing a circular, intermittently rotating stamping machine table or carrier for conveying work from a loading position through stamping positions to an unloading position and for supporting the transfer stamping impression. The hosiery workpieces are placed in registration between guides on the table at one station and they are carried, as the table turns, under pivoting stamping heads through a plurality of stamping positions, whereupon they are removed for further processing or inspection or for packaging. The machine may be controlled by one operator or two operators, depending upon the quantity of work at hand.

A web of commercial heat transfer paper is used as a printing medium in the stamping heads, the web being advanced automatically in timed relationship with the stamping cycle, and novel features are incorporated in the web feeding devices to ensure highly accurate registration of the transfer paper with respect to the workpiece. In this manner, every printed impression transferred from the web will be accurately located on the hosiery. Multiple stamping heads are provided so that separate marking may be made on the toe, heel or other parts of the hose at desired locations.

The non-standard parts for the machine of my invention may be easily constructed using conventional machine tools and suitable adjustments are provided so that the machine will accommodate various styles and sizes of hosiery quickly and easily and with little skill. Standard commercial heating irons for hand stamping are preferably employed with my machine for facility of replacement. While, in the embodiment of the invention illustrated herein, I show the stamping heads applied to an intermittently rotating carrier, it will be obvious that the principles of the machine may be applied to machines having other types of carriers as, for example, an in-line endless conveyor; also that other changes and substitutions may be made without departing from the invention as described in the sub-joined claims.

The invention will be fully understood by reference to the accompanying drawings in which—

Figure 2:
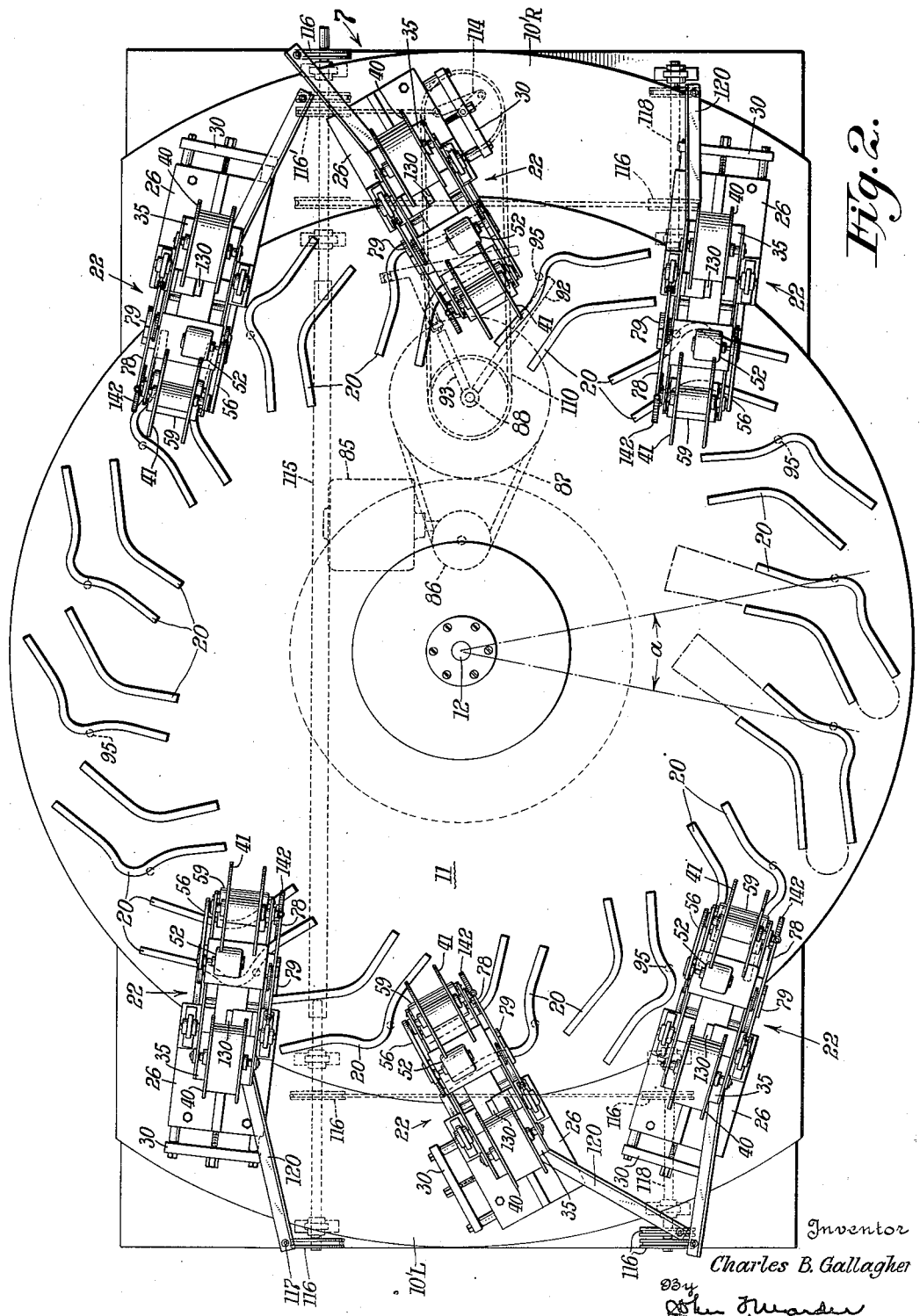
Figure 2 is a top plan view of the machine of Figure 1.
Figure 3:
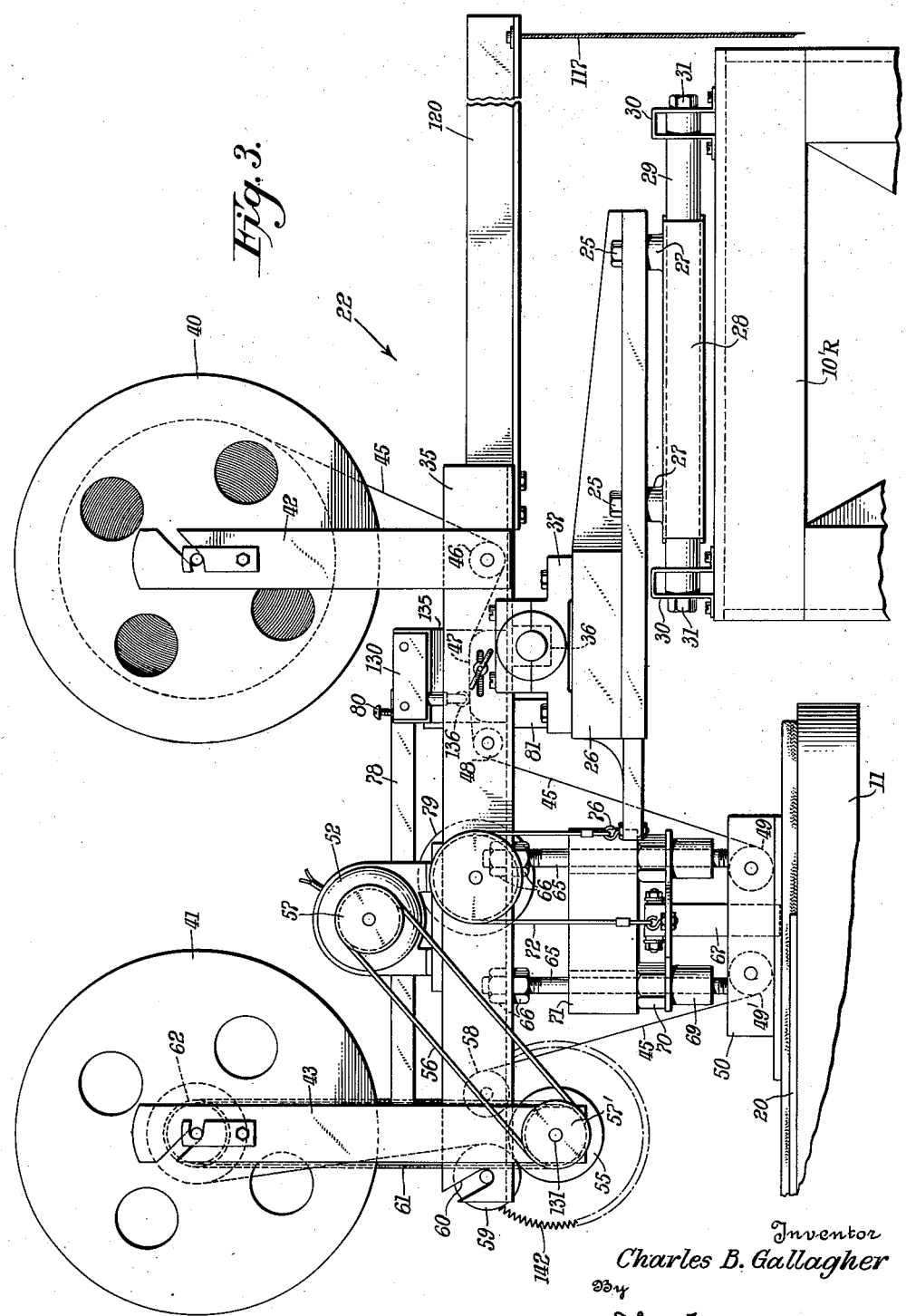
Figure 4:
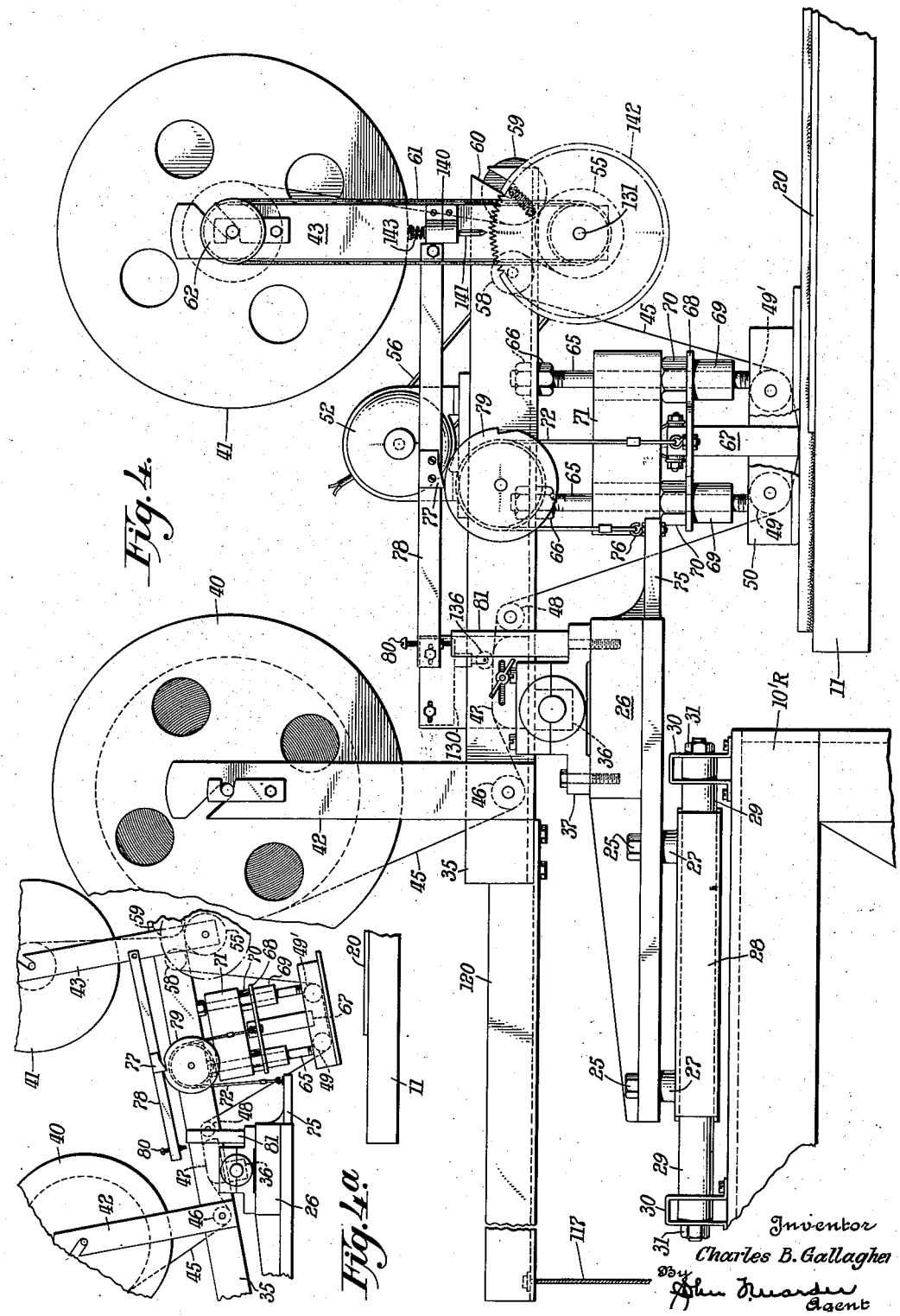
Figure 5:
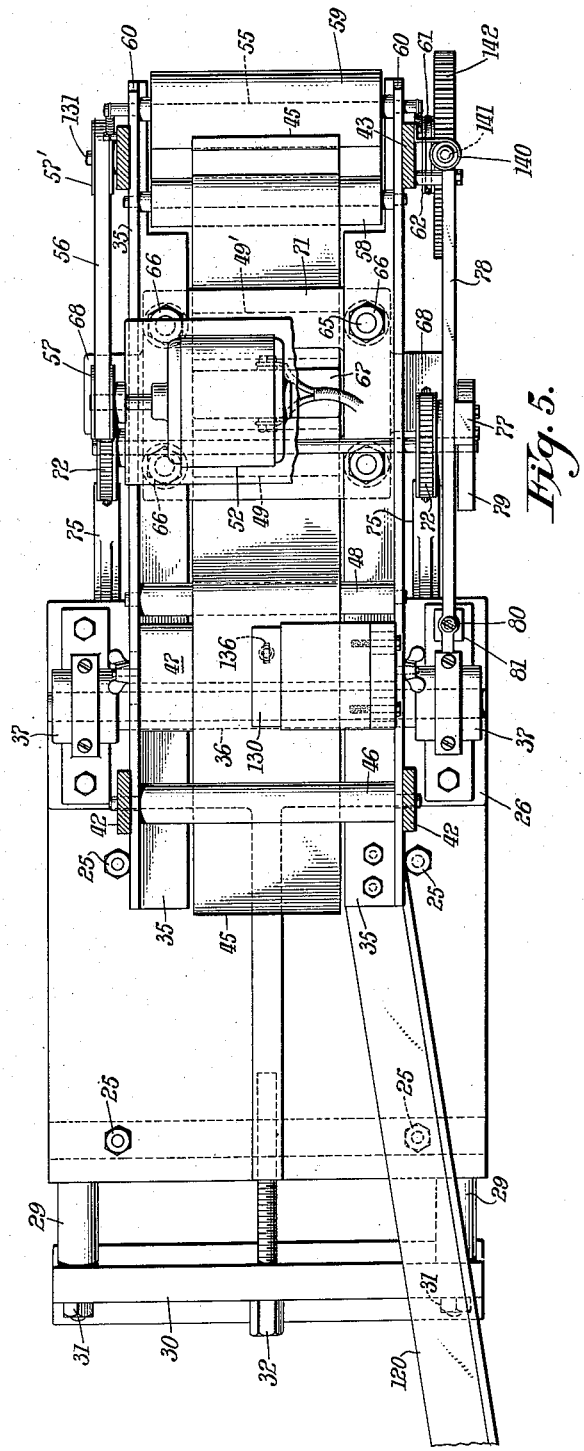
Figure 6:
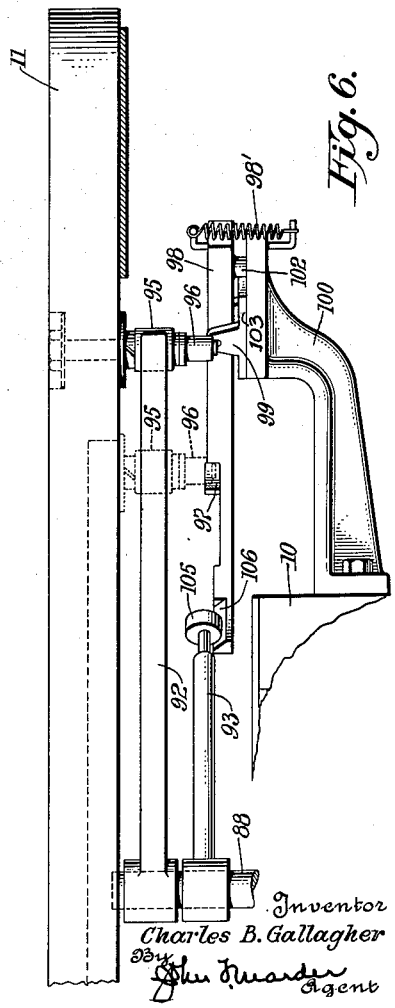

Figure 3 is a side elevation view of an enlarged scale illustrating one side of a stamping head used on my machine, Figure 4 is a view similar to that of Figure 3, showing the opposite side of a stamping head, Figure 4a is a fragmentary side elevation view in reduced scale illustrating a stamping head in tilted position, Figure 5 is a top plan view of the stamping head of Figures 3 and 4, Figure 6 is a fragmentary side elevation view of intermittent motion table driving devices, Figure 7 is an end elevation view taken in the direction of the arrow at 7, Figure 2, to illustrate stamping head tilting mechanisms, Figure 8 is a diagrammatic view showing elements of the drive for the transfer stamping material web together with electrical wiring therefor, and Figure 8A is a fragmentary view of an alternative switching arrangement for that of Figure 8.

Figure 1:
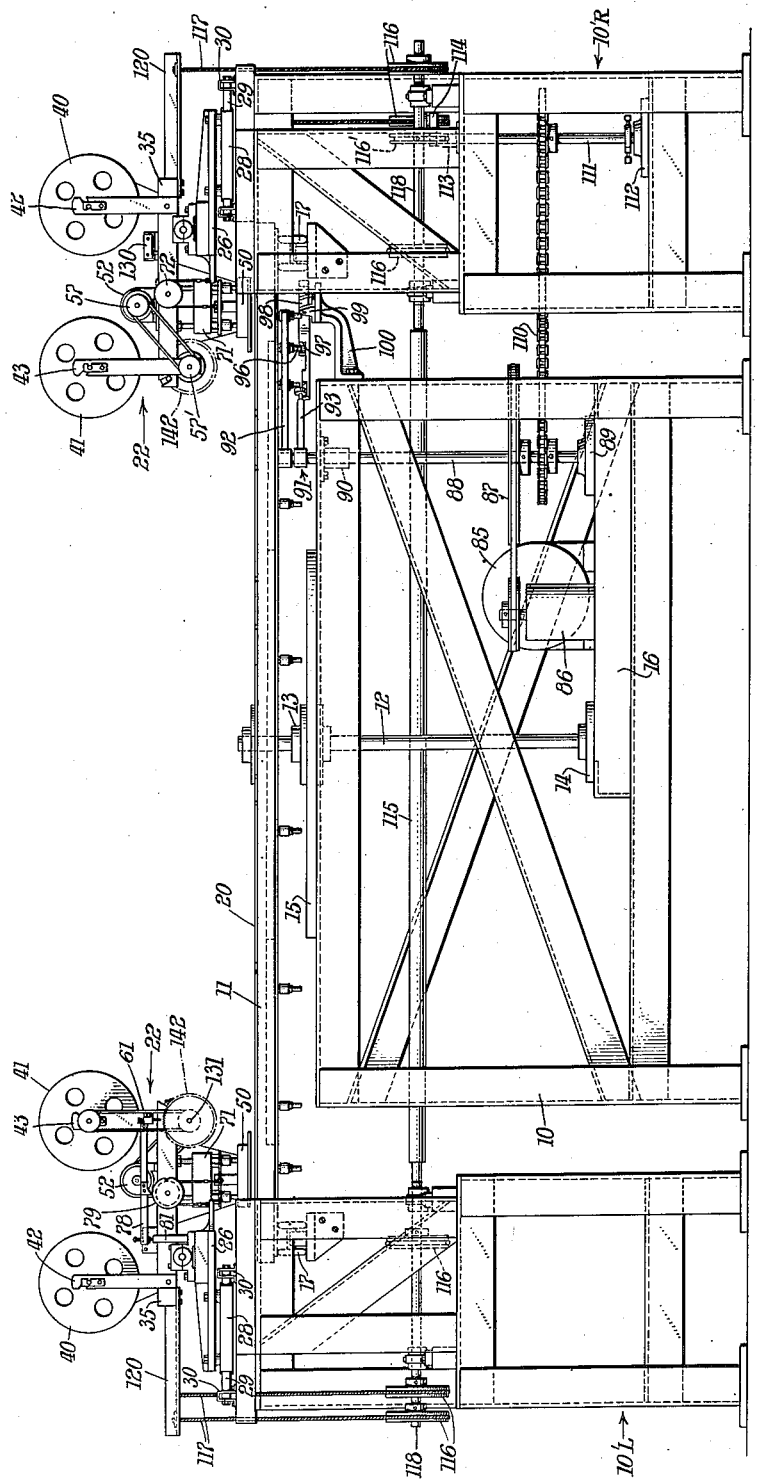
Figure 1 is a side elevation view of a stamping machine embodying my invention.

Referring to Figures 1 and 2, I provide a framework 10 having appropriate legs, horizontal members and cross-braces to support an intermittently rotatable circular table 11 situated thereabove. Table 11 is disposed substantially horizontally having a vertical supporting shaft 12 axially attached therewith which depends downwardly and is trunnioned in upper and lower bearings 13 and 14 respectively. Upper bearing 13 is fastened to an intermediate plate support 15 welded or otherwise joined to cross-members of frame 10, and lower bearing 14 is supported on a horizontal sub-frame 16 integrally associated with main frame 10. Bracketed roller thrust units 17 near the periphery of the table provide support under the edge of the table during rotation. On the upper surface of the table, see Figure 2, adjacent the periphery are a series of pairs of spaced guides 20 which conform generally with the proportions and the shape of the usual articles of hosiery. Guides 20 are open at each end to accommodate hosiery of different sizes with the toe directed toward the edge of the table and the leg directed inwardly.

Six identical stamping heads 22 are used in this preferred embodiment of my invention for marking hosiery processed threwith, the heads being arranged in groups of three left hand and three right hand head units which are supported on the auxiliary supporting structures 10'L and 10'R respectively situated adjacent the left and right hand ends of the principal table support, 10, Figure 1. Each stamping head 22 overhangs the table 11 at the guides 20 so that stamping may be performed at a prescribed location on the hosiery located therein. By reference to Figure 2 it will also be noted that angular positioning is arranged for the heads whereby they will also conform to angular location of impressions to be made on the hosiery.

Three stamping operations suffice for the usual marking on a single piece of hosiery, impressed on the toe, heel, and on the sole centrally therebetween, and an operator may progressively place hosiery in the guides at the front of the table whereupon, during machine operation, stamping will be completed when the table has turned 180° past the right hand set of three stamping heads. At the same time an operator at the rear of the table may remove the stamped hosiery as it is completed and replace it with unstamped pieces which will, in turn, be stamped during the following 180° of table travel by the left hand set of three stamping heads, to be removed from the table by the first operator.

Referring now to Figure 3, the stamping heads 22 are each adjustably fixed to the top of an auxiliary table support 10'L and 10'R, being secured in position by hexagon head cap screws 25 which fasten the main stamping head support bracket 26 to cross-members 27 directly therebeneath bridging between a pair of hollow tubes 28 slidable on support rods 29. Rods 29 terminate in inverted U-shape brackets 30 fastened to the tops of the auxiliary tables and are secured thereto by cap screws 31. Adjustment of the position of the heads 22 with respect to the auxiliary tables 10'L and 10'R and with respect to the main rotary table 10 is provided for by means of the adjusting screw 32, Figure 5, suitably interconnected between one of the brackets 30 and the stamping head support bracket 26. The particular angular setting for the heads 22 and the direction of their adjustment is arranged so that the stamped impression will conform to the hosiery being stamped, the two outside heads in each group of three being movable in a direction along their longitudinal center lines and the inside heads being movable transversely thereto.

A pair of spaced horizontal angle iron side frames 35, Figures 3, 4, and 5, located above bracket 26, form a support for a group of operating facilities which cooperate to perform the stamping operation on the hosiery. Side frames 35 are rigidly attached to a square tie bar 36 therebelow which, in turn, has its cylindrical ends pivotally trunnioned in a pair of bearing brackets 37 secured to the sides of the main stamping head supporting bracket 26, thus permitting the stamping head to be tilted with respect to its support.

Above the framework is a supply reel 40 for a web of transfer stamping material 45 to be fed-in for stamping and a rewind reel 41 for used material which is wound thereon after impression has taken place, reels 40 and 41 being removably mounted in vertical supports 42 and 43 respectively fixed on frames 35. Feeding in from the supply reel 40, the web of stamping material 45 first passes under a guide roller 46 thence horizontally between a smooth surfaced stationary guide anvil 47 and a limit switch 130 and then over a second guide roller 48. From guide roller 48 the web travels downwardly and traverses a pair of spaced rolls 49, 49' trunnioned in the lower portion of the depending stamping foot 50.

A small electric motor 52, provided with controls to be later described, mounted above the angle frames 35 intermediate of the supply reel 40 and the rewind reel 41, moves the web 45 intermittently to register the printed transfer impression on the web surface through the medium of a web driving roller 55 trunnioned in the depending ends of the posts 43. Roller 55 is interconnected with motor 52 through belt 56 and suitable driving pulleys 57, 57'. Wrap of the web about the driving roller 55 is enhanced by training it over the fixed position idler roller 58 trunnioned in side frames 35, and tension for the web is provide for by continuing its path of travel under the movably centered roller 59 trunnioned in slots 60. A slip drive belt 61 interconnects the driving roller 55 with pulley 62 secured to the rewind reel 41 tending to move the web at greater surface speed than the driving roller 55, maintaining a taut rewind web therebetween irrespective of the diameter of the roll of material which has accumulated on the reel.

Now considering the stamping devices, a series of four threaded posts 65, Figure 4, fastened to frames 35 by means of opposed pairs of lock nuts 66 and terminating in the stamping foot 50, form a carrier or guide in which an electrically heated stamping iron 67 may travel toward and away from web 45. When the heated iron 67 is in contact with the web, as shown, the transfer printing takes place on an article of hosiery in guides 20, and when moved upwardly the web may be indexed to the next consecutive stamping position, as will be later described. The incoming web, bridging guide rollers 49, 49', is taut, being so restrained by suitable friction braking means (not shown) applied at the hub of the supply reel.

In order to guide the movement of iron 67, I fasten it securely to a rectangular plate 68 which is clamped at its four corners between guide collars 69 and hexagon nuts 70 secured thereto. Guide collars 69, in turn slide freely on the four posts 65. Normally, the iron is restrained downwardly against web 45 by its own weight supplemented by the additional weight of element 71 thereabove, which is likewise guided on posts 65. These movable members, slidable with respect to posts 65, including the iron 67, plate 68 and weight 71 may be lifted by the flexible cables 72 fastened at the sides of plate 68 by hooks 73 and trained over pulleys 74, thence directed downwardly therefrom and adjustably attached to the protruding end 75 of bracket 26 by the hook connection 76. Thus, when the side frames 35 are tilted counterclockwise as shown in Figure 4a, the movable members aforementioned will be raised permitting the spring latch 77 on arm 78 pivoted to support 43 to engage the recess in the ratchet 79 which revolves with one of the pulleys 74. During the machine cycle and as the side frames 35 are tilted clock-wise to be positioned for stamping, as will be hereinafter described, latch arm 78 will be lifted when the head attains a horizontal position as latch adjusting screw 80 fastened thereto strikes the abutment member 81 on bracket 26 and the latch will thus be disengaged from the ratchet wheel 79 to permit iron 67 and its associated parts to drop, arching web 45 and pressing the heat fusible printing thereon against a piece of hosiery in guides 20.

Referring back to Figure 1 for a description of the main driving elements of my machine, an electric motor 85 mounted on sub-frame 16 is connected through a suitable gear reduction unit 86 and belt driving connections 87 to a vertical shaft 88 trunnioned in bearings 89 and 90. Intermittent rotation is required to give a period of time when the table is stationary during which stamping may take place and to index the table to stamping positions. This motion is transmitted to table 11 by the intermittent drive mechanism 91 located at the upper end of shaft 88. This drive will be more fully understood by reference to Figure 6, wherein a pair of horizontal arms 92 and 93 are shown fixed to shaft 88 and continuously rotating therewith. The upper arm 92 for driving the table is arranged to engage one of a series of rollers 95 suitably fixed to the table 11 by locking stud 96 during each revolution of shaft 88, and to turn the table counterclockwise through an angular displacement a, Figure 2, equivalent to the spacing between sets of hosiery guides 20. As the table approaches the end of its arc of travel the lower cylindrical portion of locking stud 96 will be engaged by the locking groove 97 on the lever 98. Lever 98 is provided with a pivoted connection to a small bracket 99 fastened to a larger bracket arm 100 projecting from the side of frame 10, and tension spring 98' fastened between lever 98 and arm 100 retains lever 98 clockwise with the abutment button 102 acting as a stop against stationary surface 103 on arm 100. During the balance of a revolution of shaft 88 table 11 is at rest and stamping takes place. Upon the completion of a stamping operation the roller 105 on horizontally rotating arm 93 will engage the inclined surface 106 on lever 98 tilting the lever counter-clockwise and permitting the stud 96 to be disengaged from groove 97 until the horizontal driving arm 92 engages and moves the next succeeding roller 95 to index the table to the succeeding stamping position.

After the stamping operation, but before the table has indexed, provision is made to initiate the tilting of the stamping heads 22 from the continuously rotating shaft 88, Figure 1. Chain drive 110 from shaft 88 continuously rotates a second vertical shaft 111 trunnioned in bearings 112 and 113 on auxiliary table 10'R which, in turn, actuates conversion mechanism 114 providing oscillating motion to the elongated head tilting shaft 115 trunnioned in left and right hand auxiliary tables 10'L and 10'R. The oscillatory motion of shaft 115, in turn, tilts all of the stamping heads 22 away from table 10 by interconnection therewith through axially fixed pulleys 116, flexible driving cables 117, and suitable countershafting 118; the vertically disposed flexible driving cables being directly attached to extension levers 120 fastened to side frames 35 on heads 22. The reverse operation of dropping the heads to the table for subsequent stamping, takes place after the table 10 has been indexed to the next stamping position.

Conversion mechanism 114, see Figure 7, for changing from rotary motion of shaft 111 to oscillatory motion of the long shaft 115 includes a rotating arm 122 pinned to the upper end of shaft 111 to which is pivotally joined a gyrating lever 123. Roller 124 fixed at the end of lever 123 is arranged to ride freely in an angular slot 125 formed under the fixed surface of table 10'R by a pair of spaced angle pieces 126. As rotating arm 122 turns, thus gyrating the lever 123, the roller and slot connection described will confine the end of the lever to motion parallel to the slot. Connection is made from stud 128 depending from the end of lever 123 to shaft 115 through the flexible cable 117' which fastens to the axially fixed pulley 116' to oscillate shaft 115 in one direction and to tilt the heads 22 to the position of Figure 4a. When oscillation is in the reverse direction the weight of the head overhanging its pivotal connection will overcome slack in cable 117' and return it to a horizontal position. Timing of the oscillating elements provides that for the part of the machine cycle during which the work table is stationary the heads 22 will tilt to horizontal position for the stamping operation and will be moved away to return to the position of Figure 4a. Overlap of the table indexing and head tilting functions will occur, but no mechanical interference takes place by reason of the fact that the stamping heads are not in contact with the table during indexing thereof.

Control of the movement of web 45 will best be understood by reference to Figure 8 which shows the web 45 trained from supply roll 49 under roller 46 to the bight of anvil 47 and normally closed limit switch 130, thence down under the stamping iron 67 and driven by motor 52 through belt 56, pulleys 57 and 57', drive shaft 131, and web drive roller 55. The electrical diagram is confined to a showing of switching and circuits for one motor only, but it will be readily understood that additional switching and wiring may be adapted for the motors on each stamping head.

Switch 132 at the left is closed momentarily by a suitable cam (not shown) fixed to a moving part of the machine immediately when the stamping heads 22 start to tilt away from the table. Closing the circuit at switch 132 will cut-in the timer 133 which is adjusted to supply current to motor 52 for a prescribed interval of time to advance the web a linear distance slightly short of the repetitive spacing between raised printing transfer impressions 45a on the web, shown enlarged within the circle for illustrative purposes only. At the same time current from timer 133 will energize relay coils 134, 134' to close the circuit through a pair of normally open contacts 134a, 134a'. In this manner a holding circuit is created to continue the supply of current to the motor independently of the supply through timer 133, contacts 134a closing a circuit through the limit switch 130 to coils 134, and contacts 134a' closing a circuit to one side of motor 52 outside of timer 133.

The normally closed limit switch 130, Figures 3 and 4, is adjustably positioned on bracket 135 so that it may be moved longitudinally of the web. Hence, it may be set so that, when a raised transfer impression 45a is directly under stamping iron 67, a corresponding impression will be located between the roller 136 on switch 130 and anvil 47, to raise the switch roller and break the circuit to the holding coils 134, 134' to open the contacts 134a and 134a'. Thus, timer 133 will supply the motor circuit for the major portion of the time necessary for indexing of the web and, after the timer has cut-out, the motor will continue to operate until the control circuit through switch 130 has also been broken, at which time a raised impression 45a will be in registration under iron 67 on the stamping head. The web will thus be moved without interruption irrespective of the length or configuration of the impression 45a or of any raised particles of foreign material in the web which might otherwise tend to trip switch 130 during the control by the timer. Dual control in this manner is particularly desirable by reason of the fact that for some styles of transfer stamping impressions, limit switch 130 may open and close several times during the initial movement of the web, depending upon the number of lines of printing and depending upon the shape and arrangement of the characters or designs, and, irrespective of these peculiarities, a continuous initial current supply is fed to the motor. Furthermore, since the designs differ from one another, it is possible with my machine to trip the motors for each head independently of each other and to register the designs accurately irrespective of differences in the repetitive spacing or pitch distance between the designs on the various webs used. If further protection against tripping of the web is necessary, it is possible to use a pair of limit switches 130, 130' as shown in Figure 8A connected in parallel and located over an extended anvil 47a registered with repetitive raised impressions 45a to hold the motor operative until both switch circuits are opened by the web, avoiding the possibility of a web stop due to flaws or foreign particles on the web.

During the period that the motor circuit is energized, the solenoid actuated locking means 140 will likewise be energized and pin 141 will be held away from ratchet 142 against the pressure of spring 143. When the motor circuit is opened pin 141 will descend and engage one of the depressions between the teeth of ratchet 142 and will prevent any overrun due to the inertia of parts, ensuring perfection of register of the transfer stamping material under iron 67.

Although I have described a preferred embodiment of my invention only, it will be readily understood that various changes and modifications may be made in the size and shape and arrangement of parts without departing from the invention as particularly pointed out in the subjoined claims.

I claim:

1. Web control apparatus for a transfer stamping machine, wherein the web includes raised, spaced, heat fusible impressions, comprising, in combination, stamping means to transfer the impressions from the web to workpieces, intermittent actuating means for said transfer means, a web supply reel, a web rewind reel, electric motor operated roller means intermediate of the web supply reel and web rewind reel to drive the web from the supply reel past the stamping means and to the rewind reel, first switching means controlled by said actuating means to initiate operation of said motor operated roller drive, a timer in the motor circuit to hold the current supply to the motor for a prescribed time period, and third switching means controlled by a raised impression on the web to disconnect the current supply from the motor operated roller drive.

2. Web control apparatus for a transfer stamping machine, wherein the web includes raised, spaced, heat fusible impressions, comprising, in combination, stamping means to transfer the impressions from the web to workpieces, intermittent actuating means for said transfer means, a web supply reel, a web rewind reel, electric motor operated roller means intermediate of the web supply reel and web rewind reel to drive the web from the supply reel past the stamping means and to the rewind reel, first switching means controlled by said actuating means to initiate operation of said motor operated roller drive, a timer in the motor circuit to hold the current supply to the motor for a prescribed time period, and third switching means controlled by a plurality of raised impressions on the web to disconnect the current supply from the motor operated roller drive.

3. Web control apparatus for a transfer stamping machine, wherein the web used includes raised, repetitive, heat fusible impressions, comprising, in combination, stamping means to transfer the impressions from the web to workpieces, intermittent actuating means for said transfer means, a web supply reel, a web rewind reel, electric motor operated roller means intermediate of the web supply reel and rewind reel to drive the web from the supply reel past the stamping means and to the rewind reel, first switching means controlled by said actuating means to initiate operation of said motor operated roller drive, a timer in the motor circuit to hold the current supply to the motor for a prescribed time period, and third switching means controlled by two consecutive raised impressions on the web to disconnect the current supply from the motor operated roller drive.

CHARLES B. GALLAGHER.

REFERENCES CITED

The following references are of record in the file of this patent:

UNITED STATES PATENTS

| Number | Name | Date |
| --- | --- | --- |
| 1,647,646 | May | Nov. 1, 1927 |
| 1,955,798 | Fassman | Apr. 24, 1934 |
| 2,286,458 | Bowman et al. | June 16, 1942 |